(No Model.)

F. H. SLEEPER.
ALTERNATING CURRENT GENERATOR.

No. 589,674. Patented Sept. 7, 1897.

WITNESSES:
Dorothy Fairbanks.
Marion Fairbanks.

INVENTOR
Frank H. Sleeper.
BY Henry Fairbanks.
ATTORNEY.

UNITED STATES PATENT OFFICE.

FRANK H. SLEEPER, OF ST. JOHNSBURY, VERMONT, ASSIGNOR OF ONE-HALF TO HENRY FAIRBANKS, OF SAME PLACE.

ALTERNATING-CURRENT GENERATOR.

SPECIFICATION forming part of Letters Patent No. 589,674, dated September 7, 1897.

Application filed May 21, 1896. Serial No. 592,505. (No model.)

*To all whom it may concern:*

Be it known that I, FRANK HENRY SLEEPER, of St. Johnsbury, in the county of Caledonia and State of Vermont, have invented new and useful Improvements in Alternating-Current Generators, of which the following, taken in connection with the accompanying drawings, is a specification.

This invention relates to the class of dynamos known as "inductor-alternators," but differs from those before described, which generally have shown the generator-coils wound upon stationary unmagnetized masses of iron, which receive magnetism only through inductors, which, coming between, connect them successively to a series of strong magnets which present to them an alternation of poles. I have found it possible to construct an effective and economical alternator exciting electrical currents by making use of the variations in magnetic flux in the poles of a continuously-magnetized field, which variations are caused by the movement of armature-teeth across these field-poles, the said poles being divided where they present to the armature, and these divisions or projections being wound with the generating-coils alternately right and left and left and right. The armature itself is not wound and serves only to make and change the connection across between opposite projections standing out from the poles or opposite divisions of these poles. My machines agree with other inductor-alternators in having no moving copper, but differ in having the current-generator coils upon divisions of the field-poles instead of their being wound upon separate masses of iron.

My principle of construction is applicable to many forms of machines and to those delivering polyphase currents.

Figure 1:
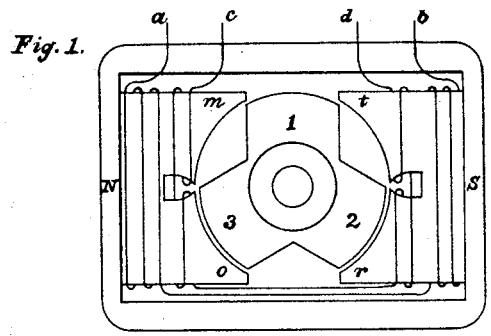
Figure 2:
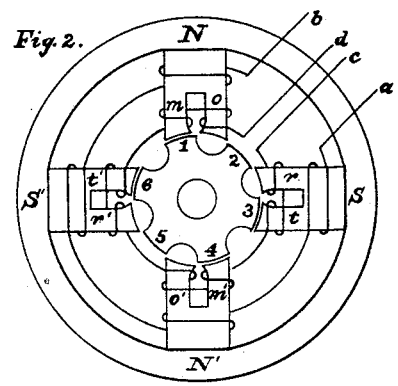
Figure 3:
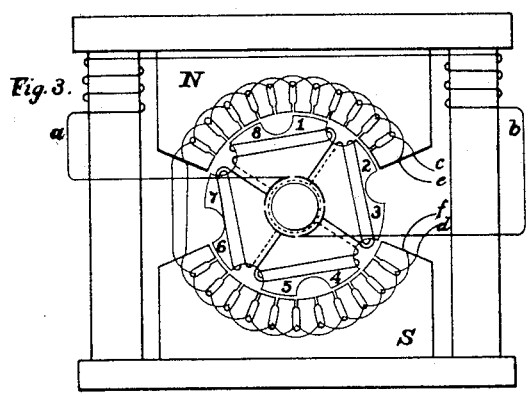
Figure 5:
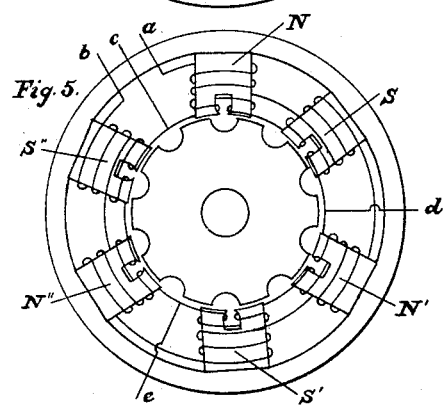

Figure 1 illustrates the simplest application of this principle, a machine with two-pole field, having each pole divided into two projections presenting to the armature, which are wound right and left with generating-coils. Fig. 2 exhibits a practical four-pole machine with each pole divided into two projections facing the armature, which has six teeth. Fig. 3 gives the outlines of a machine with two poles much divided to receive the windings and wound with two generating-wires overlapping, so as to give a two-phase current, as plotted in Fig. 4. Fig. 5 outlines a six-pole machine having poles arranged in pairs and each pole divided to present two pole projections, the pole projections of each pair or group corresponding in width and spacing to the teeth of the ten-tooth armature, but the distance between the groups not corresponding, and so in this case giving three-phase currents, as plotted in Fig. 6. Fig. 7 shows in outline a machine having its armature wound to generate the current required to magnetize the field and its two poles divided each into four projections.

All of these machines except the last require separate exciters, but any of them may be made to generate an exciting-current to magnetize the field by proper armature-windings. In all of them the armature is made up of stampings of soft iron or mild steel, slightly insulated from each other to check eddy-currents, threaded onto the shaft and strongly clamped together. The laminated mass is then turned and grooved parallel to the axis to form the teeth or projections, the grooves being of the same width as the presenting faces of the teeth. The poles of the field are built up into a laminated structure in the same way with similarly-insulated laminæ and stand out from the cast-iron ring or frame, the inside next the armature being bored out and the presenting poles being grooved or perforated to make the divisions and to receive the generator-windings.

In the machine shown in Fig. 1 the field-current from the exciter enters at $a$, magnetizes the two poles, and leaves at $b$. Inspection of the drawings will show that when the armature is in the position shown the magnetic flux will be from the half-pole $o$, through the armature-teeth 3 and 2, to the half-pole $r$, but when the armature has advanced one-sixth of a revolution it will connect the half-poles $m$ and $t$ and there will be a magnetic drop in the half-poles $o$ and $r$ and a corresponding rise in $m$ and $t$, resulting in an electric reversal in the generator-coils upon the first two and an opposite reversal in the coils upon the last two. The two generating-coils upon the north pole are wound in contrary directions, and also the two upon the divisions of the south pole, and these are connected so that the coil for the moment acting in one direction on the north pole coöperates with the connected coil on a division of the south pole, and when the armature connects the other two all contribute to a sharp electric reversal and a strong alternating current is delivered through the terminals $c$ and $d$. This machine with three-toothed armature is hardly practical, for the reason that the attraction is necessarily unbalanced, the armature in the position figured being drawn strongly down, and in the next position as strongly up, but it is shown as the simplest application of the invention and the one most easily described.

The machine illustrated in Fig. 2, with a six-tooth armature, is a good practical machine, avoiding the difficulty just referred to, since with six teeth two are always opposite to each other and the attraction is balanced. Referring to this Fig. 2 and observing the poles N S, due to the exciting-current $a\ b$, it is apparent that the magnetic flux is in the position figured through the half-poles $m\ t'$ $m'\ t$, and in the next position would be through the half-poles $o\ r\ o'\ r'$, causing sharp electrical alternations in the right and left wound generator-coils.

In the machine shown in Fig. 3 the field has two poles excited by the current $a\ b$ and divided into narrow subdivisions by slots enlarged at the bottom, through which the wires of the generating-coils are wound, these coils united in two circuits, the coils of one circuit overlapping the coils of the other circuit by half their breadth, the two subdivisions encircled by any one coil having together the same angular breadth as the presenting end of one tooth of the armature, and all the subdivisions spaced so that all those encircled by the coils of one circuit shall in one position of the armature be covered by these presenting ends of the teeth, and when the armature has moved half the angular breadth of one tooth then all the subdivisions encircled by the coils of the other circuit shall in like manner be covered by armature-teeth presented fairly to them. The coils of each circuit are alternately right and left hand wound. It is plain that in this machine the two subdivisions encircled by a single coil form practically, with reference to that coil, a single "pole-division," using that term as it applies to the types of machines previously figured.

Figure 4:
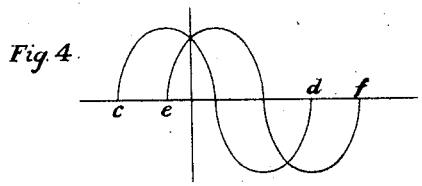

In Fig. 1 or Fig. 2 the division $m$ is encircled by a single coil, the division $o$ by another, and in Fig. 3 two subdivisions are encircled by a single coil, making together what for the purpose of this description we have defined to be "one pole-division." The field figured in Fig. 3 has upon its subdivisions six coils of one series and six coils of the other, so that while there are shown twelve subdivisions there are practically, with reference to the six coils connected in one series, only six pole-divisions, and each of these when surrounded by a single coil, though it is further subdivided, is to be considered as a single pole-division and is to be of the same angular breadth as one armature-tooth. Each pole-division of this kind, though subdivided, acts with reference to its surrounding coil as though it were undivided, and the subdivision allows the half of this pole-division with one-half of the next to be surrounded by a coil of another series, and with reference to that second series of coils these two halves, so surrounded, make up practically a single pole-division, which also is of the same angular breadth as the presenting end of an armature-tooth. Viewed in this way, it is apparent that the machine illustrated in Fig. 3 has all the features of those previously figured, only that those features as they appear in reference to the pole-divisions encircled by the coils of one circuit are all duplicated and appear again in the divisions encircled by the coils of another, so that this machine is merely a practical combination of two machines of the simpler type arranged so that the resulting electrical impulses are in different phase, and we have a two-phase machine. By further subdivision of the presenting ends of the field-poles and introducing another series of overlapping coils we should have a machine giving a three-phase current, but in all the essential parts are the same and all have the same function as in the simplest machine described above. This machine shown in Fig. 3 has an armature of eight teeth, which acts in the same way as the six-tooth armature just considered, generating an alternating current in the coils between the terminals $c$ $d$ and a similar current in those joining $e\ f$, the coils of $c\ d$ being arranged alternately with those of $e\ f$, with connections overlapping and half the breadth of an armature-tooth behind them, so that the two currents generated are half a wave-length different in phase, as illustrated in Fig. 4. For generating two-phase currents in this method, using overlapping winding, the number of subdivisions or presenting ends of the field-poles is two against each armature-tooth and two against each groove—four times as many subdivisions as there are teeth in a given part of the curve.

Figure 6:
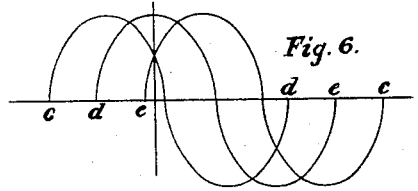
Figure 7:
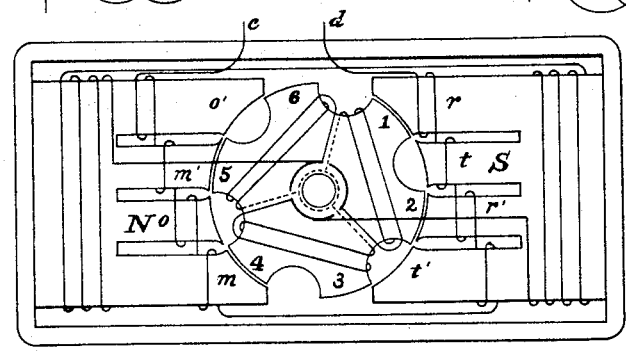

The machine illustrated in Fig. 5 has three groups of poles, two in each group, and each pole divided for the right and left wound generator-coils, the divisions of the poles in each group, where they present to the armature, being spaced to correspond to the teeth of the armature, but the spacing between the adjacent half-poles of different groups being one-third wider than the breadth of said teeth, whereby the currents generated by the three groups differ in phase by one-third, as plotted in Fig. 6. It is apparent that the same result would be secured by spacing the adjacent half-poles of different groups one-third closer than to correspond with the armature-teeth or by separating them to one and two-thirds the width of the said teeth; also, that more than two poles might be arranged in each group; also, that four groups might give four-phase currents, and this method of securing variations in phase is capable of wide application and is not limited to any one number of phases or to any one form of field.

Fig. 7 outlines a machine which is self-contained, the exciting-current being secured by a few turns of ordinary drum-winding upon the armature and the addition of a commutator. The current required for this is very small and of low voltage in proportion to the output of the machine, and the objections to a commutator and brushes are correspondingly small. Such a winding with commutator is evidently applicable to most of the other forms of machines figured and is indicated in Fig. 3.

The machine shown in Fig. 7 has the same general form as the one first figured, but each pole has four divisions and its armature six teeth with balanced attraction, so that the flow of magnetic force in the position shown is across from $m$ to $r$ and from $m'$ to $r'$, and one-twelfth of a revolution later is from $o$ to $t$ and from $o'$ to $t'$, generating an alternating current of six cycles per rotation.

In all the figures the separation of adjacent pole-divisions is exaggerated for the sake of allowing clearness of illustration of the generating-coils, but any of these machines would be constructed with the pole-divisions of substantially the same angular breadth as the teeth of the armatures, so that those teeth would be fairly presented at once to all the coöperating pole-divisions of any series.

I have purposely illustrated my invention as it appears in various forms of machine and as adapted to one or polyphase alternators, and I do not intend to limit my claim to these forms shown, since in any form of machine the poles of the field-magnets may be divided, those of each circuit wound alternately right and left, and alternating currents generated by the movement of an armature that carries no winding.

Having thus described the manner in which I carry out my invention, what I claim, and desire to secure by Letters Patent, is—

1. In an alternating-current generator, a continuously-magnetized field, each pole divided to present two or more divisions to the armature, and shaped to the path of its teeth, a revolving armature having teeth of nearly the same form and angular breadth (measured from the axis of rotation) as the said divisions of the field-poles, and moving close to them, these teeth separated by depressions of substantially the same angular breadth as the teeth, and, in combination with these elements, circuit-generating coils upon these divisions of the field-poles, the arrangement and spacing of the whole being such that, for the generating-coils of each circuit, all the right-hand-wound north-pole divisions, and all the left-hand-wound south-pole divisions shall, in one position of the armature, have its teeth presented to them, and in the next position when the armature has moved the breadth of one tooth, all the left-hand-wound north-pole divisions and all the right-hand-wound south-pole divisions shall have its teeth presented to them, whereby, when the armature is rotated, the magnetic flux is directed alternately through the two opposite-wound sets of pole-divisions, and an alternating electric current is induced in the generating-coils, substantially as herein set forth.

2. In an alternating-current generator, a continuously-magnetized field, each pole presenting to the armature two or more divisions, upon which divisions are alternately right and left hand wound generator-coils, and, in combination with these, a revolving armature having teeth, of which the angular breadth and also the spacing are substantially the same as the angular breadth of the presenting ends of the said pole-divisions, the spacing of the pole-divisions being such with reference to that of the armature-teeth that those teeth furnish, at one point of the rotation, paths for the magnetic flux across from all the right-hand-wound north-pole divisions to all the left-hand-wound south-pole divisions, and, an instant later, paths from all the left-hand-wound north-pole divisions to all the right-hand-wound south-pole divisions, whereby an alternating electric current is generated in the said circuit-coils, as herein specified.

3. In an alternating-current generator, an inductor-armature having teeth separated by spaces of the same breadth as the presenting ends of these teeth, in combination with a continuously-magnetized field, of which each pole presents to the armature-teeth pole-divisions of substantially the same angular breadth as the said teeth, these projecting pole-divisions being alternately right and left hand wound with generating-coils which are connected in two or more circuits, the angular spacing of the pole-divisions being such that at a given instant, when the pole-divisions of one circuit are fairly presented to the teeth of the armature, those of another circuit are only partly covered, being fairly presented an instant later, when the armature has moved a few degrees farther, whereby the wave of magnetic flux is also later, and the currents generated in these circuits are in different phase, as herein set forth.

4. In an alternating-current generator, an inductor-armature having teeth separated by spaces of the same breadth as the presenting ends of these teeth, in combination with a continuously-magnetized field, of which each pole presents to the armature-teeth several projecting subdivisions, upon which subdivisions are overlapping coils of two or more current-generating circuits, the coils of each circuit being alternately right and left hand wound, and the subdivisions encircled by each coil having together substantially the same angular breadth as one tooth of the armature, and the spacing of all the subdivisions being such that, at a given instant, all those right-hand wound in one circuit shall be fairly presented to the armature-teeth, and when the armature has moved part of the breadth of one tooth, all those right-hand wound by the overlapping coils of another circuit shall be fairly presented, whereby, the magnetic flux in the latter being delayed, the currents generated in these two circuits are in different phase, as herein fully set forth.

5. In an alternating-current generator, an inductor-armature having teeth separated by spaces equal to the breadth of the teeth, in combination with a continuously-magnetized field upon the divisions of the presenting poles of which are right and left hand wound circuit-generating coils, and in combination with these a winding upon the armature, and a commutator arranged to generate and convey the current necessary to magnetize the field, as herein described.

In testimony whereof I have signed my name to this specification, in the presence of two subscribing witnesses, on this 5th day of May, A. D. 1896.

FRANK H. SLEEPER.

Witnesses:
C. H. HORTON,
ALBERT L. FARWELL.